United States Patent
Imhof et al.

(10) Patent No.: US 11,151,475 B2
(45) Date of Patent: Oct. 19, 2021

(54) METHOD AND DEVICE FOR GENERATING A MACHINE LEARNING SYSTEM AND VIRTUAL SENSOR DEVICE

(71) Applicant: Robert Bosch GmbH, Stuttgart (DE)

(72) Inventors: Volker Imhof, Kornwestheim (DE); Ernst Kloppenburg, Ditzingen (DE); Heiner Markert, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 686 days.

(21) Appl. No.: 16/050,407

(22) Filed: Jul. 31, 2018

(65) Prior Publication Data
US 2019/0042980 A1 Feb. 7, 2019

(30) Foreign Application Priority Data
Aug. 3, 2017 (DE) .......................... 102017213510.7

(51) Int. Cl.
| | |
|---|---|
| *G01H 1/00* | (2006.01) |
| *G09G 5/00* | (2006.01) |
| *H04B 7/00* | (2006.01) |
| *G06N 5/02* | (2006.01) |
| *G06N 20/00* | (2019.01) |
| *G06K 9/62* | (2006.01) |
| *G06N 7/08* | (2006.01) |

(52) U.S. Cl.
CPC .......... *G06N 20/00* (2019.01); *G06K 9/6289* (2013.01); *G06N 7/08* (2013.01)

(58) Field of Classification Search
CPC ......... G06N 20/00; G06N 7/08; G06K 9/6289

USPC ....................................................... 706/1–62
See application file for complete search history.

(56) References Cited

U.S. PATENT DOCUMENTS

| | | | |
|---|---|---|---|
| 2004/0158437 A1* | 8/2004 | Klefenz | G10H 1/0008 702/189 |
| 2007/0252597 A1* | 11/2007 | Posse | G01R 33/485 324/312 |
| 2007/0299324 A1* | 12/2007 | Rasch-Menges | A61B 5/0002 600/301 |
| 2011/0120222 A1* | 5/2011 | Scholte | G01H 3/125 73/603 |

(Continued)

FOREIGN PATENT DOCUMENTS

DE 102014226485 A1 6/2016

*Primary Examiner* — Brandon S Cole
(74) *Attorney, Agent, or Firm* — Norton Rose Fulbright US LLP; Gerard Messina

(57) ABSTRACT

A method for automatically generating a machine learning system which ascertains as a function of an input variable time series an output variable time series approximating an actual output variable time series, the machine learning system ascertaining a value of the output variable assigned to the predefinable point in time as a function of input and output variable values at the points in time, which are in a predefinable time interval, prior to a predefinable point in time, only a subset of the values of the input variable within the interval and of the values of the output variable being incorporated when ascertaining the output variable assigned to the predefinable point in time, the subset being selected so that it includes available input variable values and the output variable values assigned to the points in time within the interval, which are in a predefinable equidistant selection raster within the interval.

10 Claims, 1 Drawing Sheet

(56) References Cited

U.S. PATENT DOCUMENTS

| | | | |
|---|---|---|---|
| 2011/0316784 A1* | 12/2011 | Bisutti | G06F 1/1694 |
| | | | 345/168 |
| 2012/0086596 A1* | 4/2012 | Insanic | G01S 13/951 |
| | | | 342/26 D |
| 2014/0156570 A1* | 6/2014 | Randerath | G05B 23/024 |
| | | | 706/12 |
| 2015/0003583 A1* | 1/2015 | Wang | G01N 23/04 |
| | | | 378/57 |
| 2015/0317589 A1* | 11/2015 | Anderson | G06N 7/005 |
| | | | 705/7.25 |
| 2019/0042980 A1* | 2/2019 | Imhof | G06K 9/6289 |

* cited by examiner

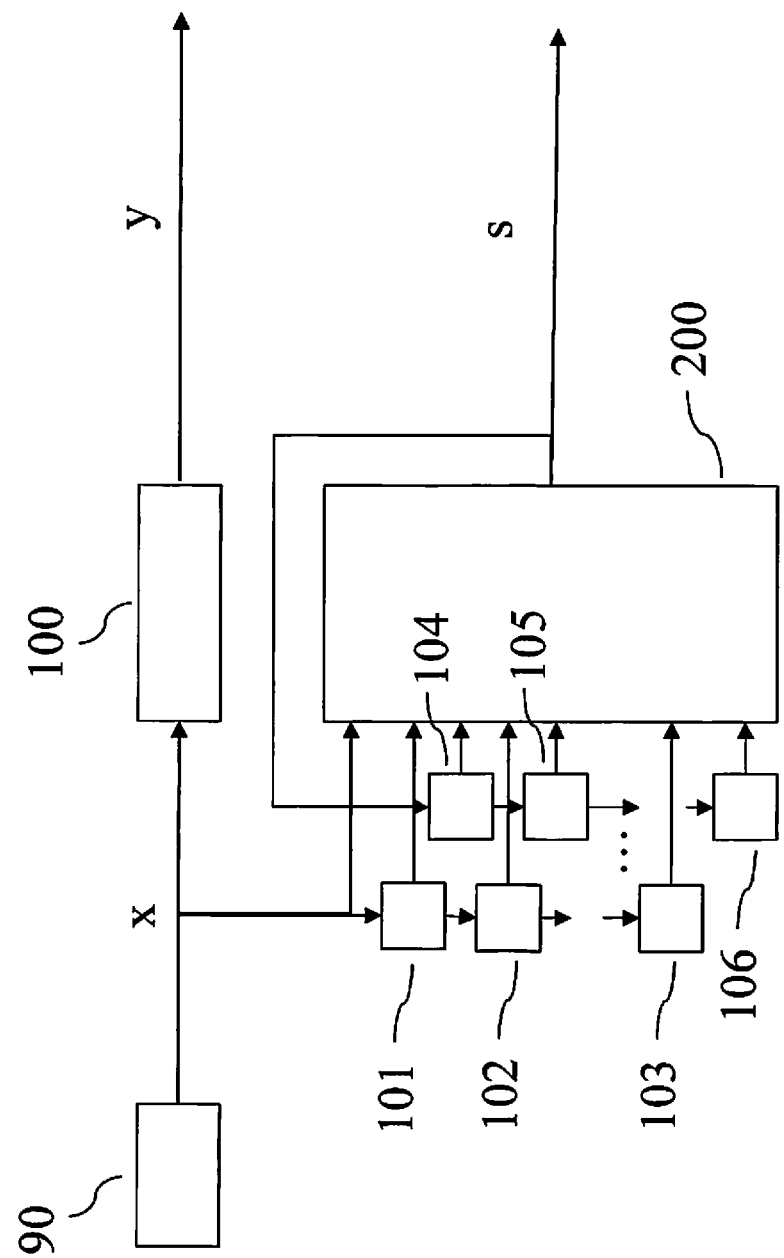

METHOD AND DEVICE FOR GENERATING A MACHINE LEARNING SYSTEM AND VIRTUAL SENSOR DEVICE

RELATED APPLICATION INFORMATION

The present application claims priority to and the benefit of German patent application no. 10 2017 213 510.7, which was filed in Germany on Aug. 3, 2018, the disclosure which is incorporated herein by reference.

FIELD OF THE INVENTION

The present invention relates to a method and a device for generating a machine learning system, a computer program which carries out the method when it runs on a computer, a machine-readable memory medium, and a virtual sensor device which includes the machine learning system.

BACKGROUND INFORMATION

A method for measuring a physical system to obtain model data points, each of which is determined by a measuring point and an assigned output value of an output variable, is discussed in DE 10 2014 226 485 A1, including the following steps:
cyclically applying predefined measuring points to the physical system;
detecting resulting output values of the output variable of the physical system when applying the measuring points;
predicting future output values of the output variable based on a prediction function which is based on a NARX model;
providing one or multiple measuring point(s) to be predefined for the physical system with the aid of a correction function when a violation of a predefined monitoring condition is detected through the profile of the predicted output values in a monitoring function.

SUMMARY OF THE INVENTION

In order to create statistical regression models and/or dynamic models, so-called NARX (nonlinear autoregressive exogenous) models may be used in which input variables and output variables of the model are added as additional input variables in a delayed manner. A static model may then be created for this expanded input space. In this way, the past is also taken into consideration.

In a first aspect, the present invention thus relates to a method for generating a machine learning system which ascertains, as a function of a time series of at least one input variable, a time series of at least one output variable which approximates a time series of an actual output variable, the machine learning system ascertaining a value of the output variable assigned to the predefinable point in time as a function of values of the input variable and of values of the output variable at points in time which are within a predefinable time interval, which are is prior to a predefinable point in time. The machine learning system may also ascertain the output variable as a function of the value of the input variable which the latter assumes at the predefinable point in time. The input variable may be a vector-valued variable in this case, i.e. the machine learning system is not necessarily of type SISO (single input, single output), but may also be of type MISO (multiple input, single output).

The machine learning system thus includes a dynamic model, for example a NARX model involving a Gaussian process.

It is further provided that only a predefinable subset of the values of the input variable available within the predefinable time interval and of the values of the output variable is incorporated when ascertaining the output variable assigned to the predefinable point in time.

For this purpose, the subset is selected in such a way that it includes exactly those available values of the input variable and the values of the output variable which are assigned to the points in time within the predefinable time interval which are in a predefinable equidistant selection raster within the predefinable time interval.

This means that the output variable assigned to the predefinable point in time is ascertained as the exact function of those values of the input variable and of the fed back output variable which are included in this subset. The predefinable equidistant selection raster is in particular a finite selection raster, i.e. it includes only a finite number of points in time.

This means that the equidistant selection raster may be characterized by a delay matrix consisting of zeros and ones each of which indicates whether or not a certain delay, i.e., a certain point in time, is used.

Such a machine learning system is applicable particularly flexibly.

In one refinement, it may be provided that parameters of the machine learning system are adapted in such a way that the time series of the output variable may be approximated to the time series of the actual output variable exactly, the time series of the input variable being fed to at least one actuator of a physical system and the actual output variable being an output signal of a sensor of the physical system.

In another aspect, it may be provided that parameters, which characterize the equidistant selection raster, are optimized in such a way that an optimization criterion is minimized, the optimization criterion being selected in such a way that the better the ascertained time series of the output variable corresponds to the time series of the actual output variable, the smaller is the value of the optimization criterion. The method of the least root-mean-square error (RMSE) may be used here as a measure, for example.

Of course, it is alternatively also possible that the optimization criterion is maximized and that the optimization criterion is selected in such a way that the better the ascertained time series of the output variable corresponds to the time series of the actual output variable, the higher is the value of the optimization criterion.

This means that this optimization problem to be resolved answers the question as to at what points in time the input and the output signals are to be used to obtain a good quality dynamic model. The variables to be optimized form the delay matrix consisting of zeros and ones which indicate whether or not a delay is used.

In one refinement, it may be provided that the optimization criterion is selected in such a way that the fewer points in time are included in the equidistant selection raster, the smaller is the value of the optimization criterion.

This means that the optimization problem is resolved by a multicriterial approach. This optimization problem is usually resolved as a Pareto front from which suitable parameters may then be selected according to predefinable criteria, for example randomly. An evolutionary algorithm, for example the NSGA-II, is advantageously used as the optimization algorithm.

In another aspect, it may be provided that the parameters, which characterize the equidistant selection raster, include a first parameter, which characterizes as to how many points in time the equidistant selection raster includes, and a second parameter, which characterizes a beginning of the equidistant selection raster, and a third parameter, which characterizes an increment of the equidistant selection raster. The parameters advantageously include exactly these three parameters.

In contrast to optimizing all inputs of the delay matrix, which corresponds to the search for an optimal binary matrix, this method corresponds to the search for an optimal integer matrix as the delay description. This has the advantage that the optimization problem is considerably smaller. This renders the search for an approximately optimal approach considerably more efficient.

This is due to the fact that each delay description of this type may be translated into a binary delay matrix. This does not work the other way around, however. Using the delay description, a considerably greater search space may thus be searched in which not all approaches are possible, however, in the sense of the binary delay matrix.

In another aspect, a method for emulating an output signal of a physical system is provided, at least one input variable being fed to at least one actuator of the physical system, a machine learning system being generated with the aid of an output signal of a sensor of the physical system using one of the above-mentioned methods, the real output signal being used as the actual output variable, and the thus generated machine learning system then being used to ascertain the output variable, which emulates the output signal, as a function of the input variable.

For example, the physical system may be an internal combustion engine whose emission values, for example NOx emission values or soot particle emission values, are usually detected by an appropriate sensor. The output signal of this sensor, i.e. of the NOx sensor or of the soot particle sensor, may then be used to generate the machine learning system in the manner described above.

In other aspects, the present invention relates to a computer program which is configured to carry out one of the above-mentioned methods when it is carried out on a computer, a machine-readable memory medium on which this computer program is stored (of course, this memory medium may be situated spatially spread out, for example when carried out in parallel spread across multiple computers), and a device for generating the machine learning system.

Thus, a method is provided for automatically generating a machine learning system which ascertains as a function of a time series of an input variable a time series of an output variable approximating a time series of an actual output variable, the machine learning system ascertaining a value of the output variable assigned to the predefinable point in time as a function of the values of the input and output variables at the points in time, which are in a predefinable time interval which is prior to a predefinable point in time, only a subset of the values of the input variable available within the predefinable time interval and of the values of the output variable being incorporated when ascertaining the output variable assigned to the predefinable point in time, the subset being selected so that it includes available values of the input variable and the values of the output variable which are assigned to the points in time within the predefinable time interval, which are in a predefinable equidistant selection raster within the predefinable time interval.

Specific embodiments of the present invention are explained below in greater detail with reference to the drawing.

BRIEF DESCRIPTION OF THE DRAWING

FIG. 1 schematically shows a described NARX structure.

DETAILED DESCRIPTION

FIG. 1 schematically shows a described NARX structure. An input variable x, for example a position of an accelerator pedal which characterizes a driver request, is received via an input block. A physical system 100, in particular a motor vehicle or a component of a motor vehicle, is controlled as a function of input variable x. In the exemplary embodiment, physical system 100 includes an internal combustion engine including an exhaust tract connected thereto. Furthermore, physical system 100 includes an NOx sensor which is installed in the exhaust tract and which ascertains an actual output variable y, specifically an NOx concentration in the exhaust gas.

Input variable x which corresponds to a point in time t and is thus also referred to in the following as $x_t$ is moreover fed to a machine learning system 200. Furthermore, the input variable is delayed in chronological delay blocks 101, 102, 103 by a chronological increment in each case and thus delayed input variable x, which now corresponds in each case to points in time t-1, t-2, t-3 and is thus also referred to as $x_{t-1}$, $x_{t-2}$, $x_{t-3}$, is also fed to machine learning system 200. Machine learning system 200, for example a Gaussian process, ascertains, as a function of input variable $x_t$, $x_{t-1}$, $x_{t-2}$, $x_{t-3}$ fed thereto, an output variable s which is also assigned to point in time t and is thus referred to as $s_t$. Output variable s is an estimated value of actual output variable y and is thus also referred to as estimated output variable s. This estimated output variable s is also delayed in chronological delay blocks by a chronological increment in each case and thus delayed estimated output variables $s_{t-1}$, $s_{t-2}$, $s_{t-3}$ are also fed to machine learning system 200. Of course, the number of the delay stages for input variable x and estimated output variable s is not necessarily equally large and does not have to include exactly 3 stages either.

Machine learning system 200 has a matrix characterizing which of delayed input variables $x_t$, $x_{t-1}$, $x_{t-2}$, $x_{t-3}$ fed thereto and delayed estimated output variables $s_{t-1}$, $s_{t-2}$, $s_{t-3}$ are actually used for ascertaining estimated output variable s.

In order to adapt the parameters of machine learning system 200 including the above-named matrix, the parameters are adapted to output variable y and to estimated output variable s as a function of chronological profiles in such a way, for example, that a distance metric between output variable y and estimated output variable s may be small.

For this purpose, a first parameter n is provided for example which characterizes as to how many points in time are used in the equidistant selection raster and a second parameter offset is provided which characterizes a beginning in the equidistant selection raster, and a third parameter is provided which characterizes an increment. n, offset, and delta are integers in the exemplary embodiment.

Exactly those delayed input variables $x_T$ and delayed estimated output variables $s_T$ are then incorporated when ascertaining estimated output variable s whose assigned point in time T meets the equation $$T=t-(\text{offset}+(i-1)*\text{delta})$$

for an integer i=1, . . . , n.

Parameters n, delta, offset as well as the remaining parameters of the machine learning system are then optimized in the usual manner.

It is possible to ascertain separate parameter sets n, delta, offset for each input variable x and output variable s in each case, but it is also possible to use the same parameter set.

When the adaptation of the parameters is completed, machine learning system 200 may be used as a virtual sensor which ascertains output variable s instead of the sensor which ascertains actual output variable y.

A virtual sensor of this type may be installed, for example, in an engine control unit so that the sensor may be dispensed with or the virtual sensor monitors the sensor. This makes it possible to control the internal combustion engine as a function of ascertained output variable s, for example by selecting its operating point as a function of ascertained output variable s.

A soot sensor may similarly be used and emulated instead of an NOx sensor, for example.

It is also possible that a prognosis regarding the output variables to be expected, exhaust gas values in the present case, is ascertained with the aid of the virtual sensor.

Another possible application would be modeling the voltage signal as actual output variable y from the measured current and the state of charge of a battery as input variable x.

What is claimed is:

1. A method for automatically generating a machine learning system, the method comprising:
   automatically generating a machine learning system by ascertaining as a function of a time series of an input variable a time series of an output variable which approximates a time series of an actual output variable, by performing the following:
   ascertaining a value of output variable assigned to the predefinable point in time as a function of the values of the input variable and of the values of the output variable at the points in time, which are in a predefinable time interval which is prior to a predefinable point in time;
   wherein only a subset of the values of the input variable available within the predefinable time interval and of the values of the output variable is incorporated when ascertaining the output variable assigned to the predefinable point in time, the subset being selected so that it includes exactly the available values of the input variable and the values of the output variable which are assigned to the points in time within the predefinable time interval which are in a predefinable equidistant selection raster within the predefinable time interval.

2. The method of claim 1, wherein parameters of the machine learning system are adapted so that the time series of the output variable is approximated to the time series of the actual output variable, the time series of the input variable being fed to at least one actuator of a physical system and the actual output variable being an output signal of a sensor of the physical system.

3. The method of claim 1, wherein parameters, which characterize the equidistant selection raster, are optimized so that an optimization criterion is minimized, the optimization criterion being selected so that the better the ascertained time series of the output variable corresponds to the time series of the actual output variable, the smaller is the value of the optimization criterion.

4. The method of claim 3, wherein the optimization criterion is selected so that the fewer points in time are included in the equidistant selection raster, the smaller is the value of the optimization criterion.

5. The method of claim 1, wherein the parameters, which characterize the equidistant selection raster, include a first parameter, which characterizes as to how many points in time the equidistant selection raster includes, and a second parameter or offset, which characterizes a beginning of the equidistant selection raster, and a third parameter, which characterizes an increment of the equidistant selection raster.

6. The method of claim 5, wherein the parameters include exactly the first parameter and the second parameter or offset, and the third parameter.

7. A non-transitory computer readable medium having a computer program, which is executably by a processor, comprising:
   a program code arrangement having program code for automatically generating a machine learning system, by automatically generating a machine learning system by ascertaining as a function of a time series of an input variable a time series of an output variable which approximates a time series of an actual output variable, by performing the following:
   ascertaining a value of output variable assigned to the predefinable point in time as a function of the values of the input variable and of the values of the output variable at the points in time, which are in a predefinable time interval which is prior to a predefinable point in time;
   wherein only a subset of the values of the input variable available within the predefinable time interval and of the values of the output variable is incorporated when ascertaining the output variable assigned to the predefinable point in time, the subset being selected so that it includes exactly the available values of the input variable and the values of the output variable which are assigned to the points in time within the predefinable time interval which are in a predefinable equidistant selection raster within the predefinable time interval.

8. The computer readable medium of claim 7, wherein parameters of the machine learning system are adapted so that the time series of the output variable is approximated to the time series of the actual output variable, the time series of the input variable being fed to at least one actuator of a physical system and the actual output variable being an output signal of a sensor of the physical system.

9. A device for generating a machine learning system, comprising:
   a non-transitory computer readable medium having a computer program, which is executably by a processor, including:
   a program code arrangement having program code for automatically generating a machine learning system, by automatically generating a machine learning system by ascertaining as a function of a time series of an input variable a time series of an output variable which approximates a time series of an actual output variable, by performing the following:
   ascertaining a value of output variable assigned to the predefinable point in time as a function of the values of the input variable and of the values of the output variable at the points in time, which are in a predefinable time interval which is prior to a predefinable point in time;
   wherein only a subset of the values of the input variable available within the predefinable time interval and of the values of the output variable is incorporated when ascertaining the output variable assigned to the predefinable point in time, the subset being selected so that it includes exactly the available values of the input variable and the values of the output variable which are assigned to the points in time within the predefinable time interval which are in a predefinable equidistant selection raster within the predefinable time interval.

10. The method of claim 1, wherein parameters of the machine learning system are adapted so that the time series of the output variable is approximated to the time series of the actual output variable exactly, the time series of the input variable being fed to at least one actuator of a physical system and the actual output variable being an output signal of a sensor of the physical system.

* * * * *